United States Patent
Kitajima

(10) Patent No.: US 7,508,420 B2
(45) Date of Patent: Mar. 24, 2009

(54) IMAGE PROCESSING APPARATUS

(75) Inventor: Tatsutoshi Kitajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 716 days.

(21) Appl. No.: 10/764,450

(22) Filed: Jan. 27, 2004

(65) Prior Publication Data
US 2004/0252203 A1 Dec. 16, 2004

(30) Foreign Application Priority Data
Feb. 12, 2003 (JP) ............................ 2003-034413

(51) Int. Cl.
H04N 5/232 (2006.01)
H04N 5/228 (2006.01)
(52) U.S. Cl. ................ 348/211.99; 348/222.1
(58) Field of Classification Search ............ 348/222.1, 348/220.1, 371, 223.1, 211.99, 211.1, 207.99, 348/373–376; 396/53, 89, 278; 455/3.06, 455/556.1, 556.2, 555, 557; 382/251
See application file for complete search history.

(56) References Cited

U.S. PATENT DOCUMENTS

| | | | |
|---|---|---|---|
| 5,109,249 A | | 4/1992 | Kitajima |
| 5,229,805 A | | 7/1993 | Kitajima |
| 5,682,563 A | | 10/1997 | Shinohara et al. |
| 5,748,233 A | | 5/1998 | Kitajima et al. |
| 5,754,227 A | * | 5/1998 | Fukuoka ................ 348/231.6 |
| 5,808,681 A | | 9/1998 | Kitajima |
| 5,937,100 A | | 8/1999 | Kitajima |
| 6,075,562 A | | 6/2000 | Sakaguchi et al. |
| 6,104,430 A | * | 8/2000 | Fukuoka ................ 348/231.6 |
| 6,111,604 A | * | 8/2000 | Hashimoto et al. ....... 348/220.1 |
| 6,327,001 B1 | * | 12/2001 | Yamagishi ................ 348/552 |
| 7,027,084 B1 | * | 4/2006 | Watanabe ............... 348/211.2 |
| 7,136,102 B2 | * | 11/2006 | Misawa ................. 348/333.02 |

FOREIGN PATENT DOCUMENTS

| | | |
|---|---|---|
| JP | 6-133081 | 5/1994 |
| JP | 10-126565 | 5/1998 |
| JP | 2004-96166 | 3/2004 |
| JP | 2004-242200 | 8/2004 |

OTHER PUBLICATIONS

U.S. Appl. No. 09/879,041, filed Jun. 13, 2001, Kitajima et al.
U.S. Appl. No. 10/087,955, filed Mar. 5, 2002, Kitajima.
U.S. Appl. No. 10/230,162, filed Aug. 29, 2002, Kitajima et al.
U.S. Appl. No. 10/354,086, filed Jan. 30, 2003, Ojima et al.
U.S. Appl. No. 10/764,450, filed Jan. 27, 2004, Kitajima.

* cited by examiner

*Primary Examiner*—Sinh Tran
*Assistant Examiner*—Tuan H Le
(74) *Attorney, Agent, or Firm*—Oblon, Spivak, McClelland, Maier & Neustadt, P.C.

(57) ABSTRACT

When an external communication device (14) is connected to an image processing apparatus, the external communication device (14) transfers identification information to the image processing apparatus through a communication driver (10). A central processing portion (8) transmits information of the image processing apparatus through the communication driver (10) when a communication with the connected communication device (14) is possible. This information of the image processing apparatus is information which can be processed by the communication device, and includes a program which can be executed by the communication device (14). As a result of executing the program of the information of the image processing apparatus, functions of photographing and playback and the like of the image processing apparatus can be selected and instructed from the communication device (14).

8 Claims, 8 Drawing Sheets

FIG. 4

○ COMMUNICATION

○ PHOTOGRAPHING ⟶ SIZE OF IMAGE ?

○ PLAYBACK

○ TRANSMISSION ⟶ SIZE OF IMAGE ?

○ POWER STANDBY

○ DISPLAYING OF MONITORING

EXAMPLE OF DISPLAYING IN COMMUNICATION DEVICE

OPERATION OF PERFORMING PLAYBACK

OPERATION OF COMMUNICATION

IMAGE PROCESSING APPARATUS

BACKGROUND OF THE INVENTION

1. Field of the Invention

The present invention relates to a system in which an image processing apparatus such as a camera is combined with a communication device such as a mobile phone, and particularly relates to an image processing apparatus preferable for establishing a general-purpose system for transmitting and receiving an image of a digital camera by means of the mobile phone.

2. Description of the Prior Art

From past, there has been demanded transmission of an image from one place to another distant place conveniently. As a solution to this demand, a device which has a structure integrally equipped with a function for an electronic still camera such as a so-called digital camera and a function for a mobile phone, has been utilized.

For example, there is shown a device in which a function for the mobile phone is provided in the electronic still camera, as disclosed in Japanese Patent Laid Open No. H6-133081. Contrarily, there is also known a device in which a function for the electronic still camera is equipped in the mobile phone.

However, in a case of structuring the device integrated with the function for the mobile phone and the function for the electronic still camera without undermining portability as described above, it is difficult to adapt a function of a camera to a process for a large number of pixels, or to provide the device having a function of processing in higher speed, since there is a limit in a size of a hardware in itself.

Normally, in order to provide the electronic still camera to be high in performance and sophisticated while enhancing the portability of a portable communication device such as the mobile phone, it is desirable to separate the electronic still camera and the portable communication device into discrete devices respectively.

Considering the aforementioned circumstance, there has been proposed a structure configured to be capable of freely connecting the portable communication device and a main body of an image processing device which are the discrete devices. For example, there is disclosed in Japanese Patent Laid Open No. H10-126565 a structure configured to be capable of connecting the digital camera or a portable image-capturing device such as an image scanner with the mobile phone or a facsimile machine and the like.

However, a manufacturer or the like of the devices do not always match between the communication device and the image processing device such as the image-capturing device. Besides, conformity of a mounted function or the like between respective manufacturers of the communication device and the image processing device has not been ensured mutually, thus a problem occurs that the connection of them is impossible except for a special case.

Nonetheless, generally the communication device such as the mobile phone includes many basic functions which are common regardless of the manufacturers or systems, and even when a difference in the basic functions by a discrepancy between the manufacturers or the systems is present, there are many occasions that the functions can be classified broadly into several genre.

SUMMARY OF THE INVENTION

The present invention has been made in view of the circumstances as described above. Therefore, it is an object of the present invention to provide an image processing apparatus capable of carrying out a coordinated operation between a main body of the image processing apparatus and an external communication device by a relatively simplified structure without adapting the image processing apparatus to the external communication device individually.

To accomplish the above object, an image processing apparatus according to the present invention comprises a camera function portion; a communication judging portion for judging whether or not a communication with an external communication device is possible by a signal from the external communication device; and a data communication portion which carries out the communication with the external communication device when judged by the communication judging portion that the communication is possible and transmits data including a program for controlling the camera function portion from the external communication device to the external communication device.

In addition, the aforementioned camera function portion includes an operating portion for inputting an operation externally; an imaging portion for photographing an image of a subject; a digital processing portion for performing a digital processing to various signals including photographing data of the imaging portion; a displaying portion for displaying image data processed by the digital processing portion; a communication function portion included in a main body of the image processing apparatus or provided attachably and detachably on the main body of the image processing apparatus to communicate with the external communication device; a data storing portion for storing digital data which relates to the digital processing portion; and a central controlling portion for controlling the operating portion, the imaging portion, the digital processing portion, the displaying portion, the communication function portion and the data storing portion.

According to the above described structure, because data including a program for controlling the camera function portion from the external communication device is transmitted to the data communication portion from the external communication device, it is not necessary to provide the main body of the image processing apparatus and the external communication device to be corresponded to each other individually beforehand. As a result, the coordinated operation between the main body of the image processing apparatus and the external communication device becomes possible by the relatively simplified structure without especially sacrificing portability of the external communication device.

BRIEF DESCRIPTION OF THE DRAWINGS

FIG. 4 is a diagram showing one example of a menu of an operation displayed on a screen of the mobile phone in a process of the communication processing in FIG. 3.

DETAILED DESCRIPTION OF THE PREFERRED EMBODIMENTS

Hereinafter, an image processing apparatus according to the present invention will be described in detail based on embodiments of the present invention with reference to the accompanying drawings.

Figure 1:
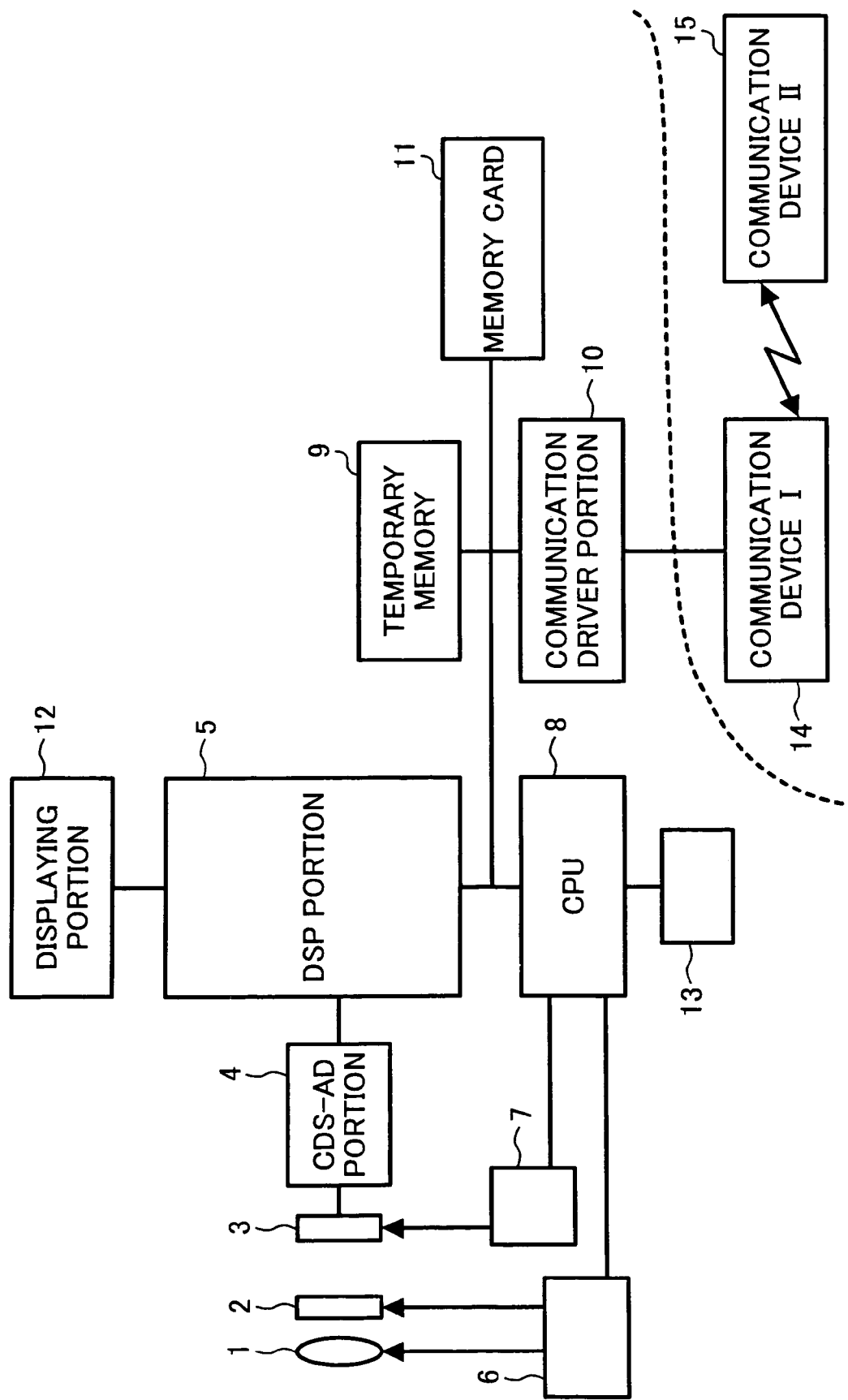
FIG. 1 is a block diagram showing a structure of essential portions of a digital camera as an image processing apparatus according to a first embodiment of the present invention.

A digital camera shown in FIG. 1 is provided with a photographing lens 1, a mechanical shutter 2, a CCD (Charge Coupled device) imaging device 3, a correlated double sampling-A/D (Analog-Digital) converting portion (hereinafter referred to as "CDS-AD portion") 4, a digital signal processor portion (hereinafter referred to as "DSP portion") 5, a mechanical driver portion 6, a CCD driving circuit portion 7, a central processing unit (CPU) 8, a temporary memory 9, a communication driver portion 10, a memory card 11, a displaying portion 12, and a controlling portion 13.

The photographing lens 1 focuses an image of a subject onto an input surface of the CCD imaging device 3. The mechanical shutter 2 controls an entrance timing of the subject image and a length of an entrance time of the subject image by opening and shutting an entering light flux which enters to the CCD imaging device 3. The CCD imaging device 3 converts an entering optical image of the subject into an electrical signal. The CDS-AD portion 4 performs a correlated double sampling of an imaging signal of the CCD imaging device 3 and converts the imaging signal from analog to digital, and supplies the digitalized imaging signal to the DSP portion 5. The DSP portion 5, for example, applies a digital signal process to the digital signal obtained by the imaging signal being converted from the analog to the digital at the CDS-AD portion 4, and converts the digital signal into a Y-signal as a brilliance signal and into a U and V signals as a chrominance difference signal, and compresses data of these Y, U and V signals by JPEG compression. The mechanical driver portion 6 controls a mechanical operation including a movement of the photographing lens 1 in a direction of an optical axis for focusing and a movement of the opening and the shutting of the mechanical shutter 2. The CCD driving circuit portion 7 controls and drives the CCD imaging device 3.

The central processing portion 8 controls respective portions of the digital camera so as to operate altogether as the digital camera properly. The temporary memory 9 is a memory for temporarily holding imaged image data obtained from the DSP portion 5 and data such as read-data from a file of the memory card 11, and is used as a work memory of the DSP portion 5 and the central processing portion 8. The communication driver portion 10 is a driver for the digital camera to carry out a communication with outside. The memory card 11 is, in a normal case, a nonvolatile memory such as so-called a flash memory detachably mounted in the digital camera, and stores the imaged image data and the like. The displaying portion 12 displays an image-output signal given from the DSP portion 5, and this displaying portion 12 includes a display having a displaying controller for converting the image output signal into, for example, a signal capable of being displayed by a liquid crystal, and for instance, a liquid crystal display (LCD) to actually display an image of the image-output signal. The controlling portion 13 includes various switches for inputting information to the central processing portion 8, and is used for an inputting operation by a user of this digital camera.

The communication driver portion 10 is connected with an external first communication device (communication device I) 14. The first communication device 14 carries out the communication with a second communication device (communication device II) 15 through a telephone line. Although there may be a case that the image processing apparatus of the present invention is controlled by the first communication device 14 directly connected with the image processing apparatus through a connection wire, it may also be recommendable that the image processing apparatus is controlled from the second communication device 15 by a wireless connection such as a mobile phone line through the first communication device 14.

Meanwhile, at least the DSP portion 5, CCD driving circuit portion 7, the temporary memory 9 and the communication driver portion 10 within the structure shown in FIG. 1 are necessary for the image processing apparatus according to the present invention. When the digital camera is used as the image processing apparatus, the image processing apparatus becomes such structure shown in FIG. 1.

Figure 2:
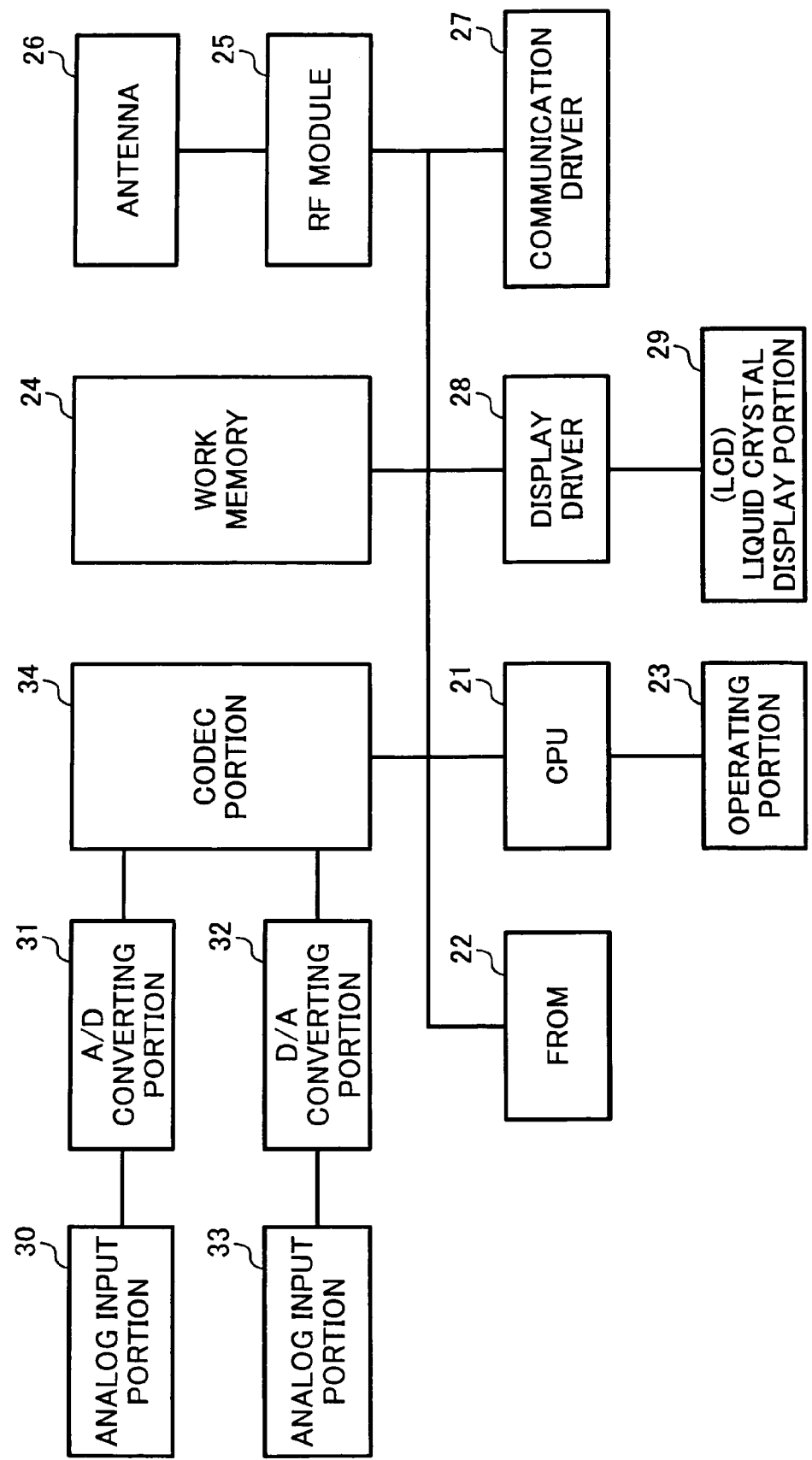
FIG. 2 is a block diagram showing a structure of a mobile phone as an external communication device connected to the digital camera shown in FIG. 1.

Next, FIG. 2 shows a structure of the mobile phone as one example of a communication device used as the first communication device 14 in FIG. 1. The mobile phone shown in FIG. 2 is provided with a central processing portion (CPU) 21, a flash ROM (Read Only Memory) 22, an operating portion 23, a work memory 24, a RF (Radio Frequency) module 25, an antenna 26, a communication driver portion 27, a display driver 28, a liquid crystal display portion (LCD) 29, an analog input portion 30, an A/D (Analog-Digital) converting portion 31, a D/A (Digital-Analog) converting portion 32, an analog output portion 33, and a CODEC portion 34.

The central processing portion 21 controls the entire communication device. The flash ROM 22, in this case, stores a program for an operation of the central processing portion 21. The operating portion 23 includes various switches for inputting information into the central processing portion 21, and is used for an inputting operation by a user of this mobile phone. The work memory 24 is used for controlling and processing of the mobile phone, and at least one of a program and data received from the outside through the communication driver portion 27 and capable of being processed by the central processing portion 21, is also stored in the work memory 24.

The RF module 25 and the antenna 26 are portions for carrying out transmission and receiving with other communication device by a wireless communication, and in a case of the mobile phone, the transmission and the receiving are carried out through the mobile phone line. The communication driver portion 27 is connected with the communication driver portion 10 of the digital camera as the image processing apparatus shown in FIG. 1, and carries out the communication with the communication driver portion 10 mutually. The display driver 28 and the liquid crystal display portion 29 are capable of displaying information on a condition regarding an operation of the mobile phone and an image stored in the work memory 24. The analog input portion 30 and A/D converting portion 31 are portions for carrying out a voice input to the mobile phone, and a mike (microphone) for the voice input is included in the analog input portion 30. An analog input of the analog input portion 30 is converted into digital information by the A/D converting portion 31, and the digital information is given to the CODEC portion 34. The D/A converting portion 32 and the analog output portion 33 are portions for carrying out a voice output from the mobile phone. The digital information given from the CODEC portion 34 is converted into an analog signal, and that analog signal is acoustically outputted as a voice by the analog output portion 33 which includes a speaker. In the mobile phone, the mike included in the analog input portion 30 is provided in vicinity of a mouthpiece, and the speaker included in the analog output portion 33 is provided in vicinity of an earpiece.

The CODEC portion 34 encodes digital voice data as well as decodes the encoded data to the digital voice data.

Meanwhile, at least the central processing portion 21, the flash ROM 22, the operating portion 23, the work memory 24, the RF module 25, the antenna 26, the communication driver portion 27, the display driver 28, and the liquid crystal display portion 29 are necessary for the communication device, and the analog input portion 30, the A/D converting portion 31, the D/A converting portion 32, the analog output portion 33, and CODEC portion 34 are included in addition to those, in a case if the mobile phone is used as the communication device. This communication device is not only capable of being used as the first communication device 14 in FIG. 1 but also can be used as the second communication device 15.

Next, an operation on processing when the digital camera as the image processing apparatus and the mobile phone as the external communication device shown in FIGS. 1 and 2 are connected will be described with reference to FIG. 3.

Figure 3:
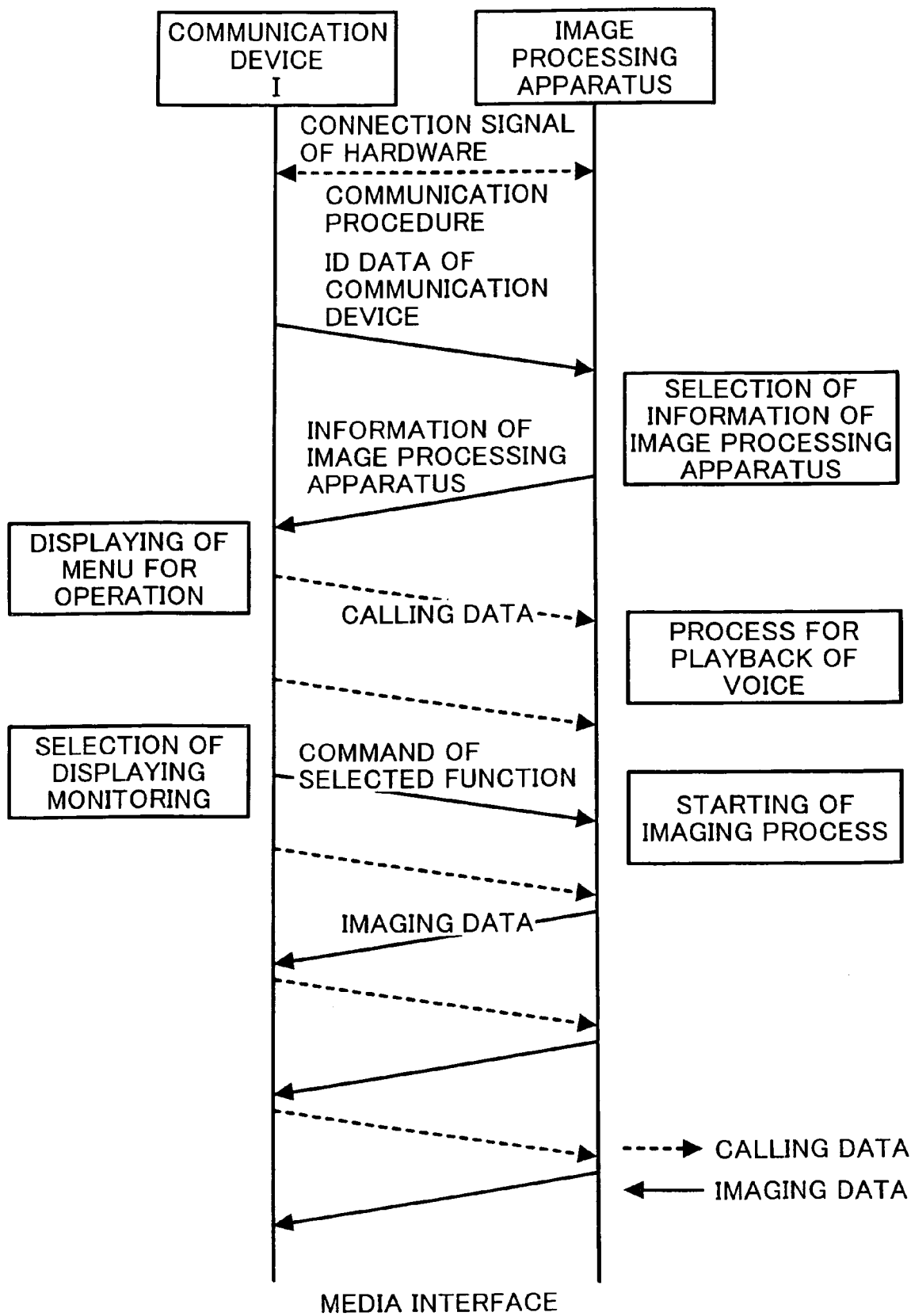
FIG. 3 is a diagram representing a flow of transmitting and receiving signals in a communication processing when the digital camera in FIG. 1 and the mobile phone in FIG. 2 are connected to be coordinated.

As shown in FIG. 3, when the external communication device is connected to the image processing apparatus, the image processing apparatus and the external communication device detect each other's connection by a connection signal of hardware. The external communication device transmits a communication procedure and identification data which can designate the communication device, more specifically, ID data of the communication device, to the image processing apparatus.

The ID data of the communication device may be, for example, a name of manufacturer and a name of product or a part number. Also, if there is a basic specification of device of the communication device which can be recognized by the image processing apparatus, the ID data of the communication device may be data representing a matching version that matches with the basic specification of device. Based on a content of receiving of this ID data of the communication device, the image processing apparatus judges whether or not the communication with the connected communication device is possible, and this is a "communication judging portion". If the communication with the communication device is possible, the image processing apparatus transmits data of the image processing apparatus to the communication device, and this is a basic "data communication portion". Hereinafter, this transmission data will be referred to as "information of image processing apparatus".

The information of the image processing apparatus includes information of functions of the image processing apparatus, and gives means for the communication device to be capable of selecting and commanding to execute those functions.

This information of the image processing apparatus is information which can be processed by the communication device, and includes a program which can be executed by decoding that program, or a program which can be executed directly, by the central processing portion 21 of the communication device. For example, the program may be an intermediate code that can be decoded even by the central processing portions 8 and 21 which are different between the image processing apparatus and the communication device. In this case, the communication device converts the intermediate code into a program capable of being executed by the central processing portion 21 of the communication device, and executes this program.

It may be recommendable to provide the image processing apparatus to specify the communication device by the ID data of the communication device, and to automatically change the information of the image processing apparatus to be capable of being processed by the communication device, and to transmit the processed information of the image processing apparatus to the communication device. For example, when the information of the image processing apparatus is display data to be displayed on the communication device, the image processing apparatus changes a size or the like of the display data in accordance with a display configuration of the communication device.

Preferably, there is configured the image processing apparatus so as to be capable of establishing a system in which the image processing apparatus can be used for any communication devices whatsoever if there is the above mentioned basic specification of the device in the communication device and if the image processing apparatus has a program of the intermediate code which is compliant with that basic specification of the device as the information of the image processing apparatus.

In addition, as a result of executing the program of the information of the image processing apparatus, such displaying of a menu shown in FIG. 4 is performed on the liquid crystal display portion 29 of the communication device. A function which has been displayed in the menu on the liquid crystal display portion 29 can be selected by operating the operating portion 23 of the communication device itself. By doing so, it becomes possible to select and instruct photographing and playback functions and the like, which are the functions of the image processing apparatus, by the communication device.

Moreover, it also becomes possible to set a power of the image processing apparatus to be a standby condition which is low in power consumption, or on the contrary, to release the standby condition of the image processing apparatus by only selecting a function in the menu.

If the image processing apparatus and the communication device are provided as mentioned above, the communication device as a communication function portion itself can be downsized and portability of the communication device can be maintained, by means of dividing the communication function portion into a system of the communication device capable of handling an image processing and an image processing portion which a high performance and sophisticated features are desired as well as having a large sized hardware portion. Also, the image processing apparatus can maintain compatibility even to various kinds of communication devices, by transmitting and receiving information on devices between the image processing apparatus and the external communication device mutually.

In addition, compared with the one that executes controlling of an image processing apparatus by carrying out transmitting and receiving of a control command and a control parameter between a communication device and the image processing apparatus, in the present embodiment, a content of controlling for the processing of the image is decided within the communication device, and a result of the controlling which has been decided is sent to the image processing apparatus, by providing the information of the image processing apparatus to be the program that can be executed by the central processing portion of the communication device. Consequently, the communication between the communication device and the image processing apparatus can be simplified.

Next, a second embodiment of the present invention which carries out the photographing and the playback, by controlling the function of a camera of the image processing apparatus from the communication device will be described with referring to FIGS. 5 and 6.

Figure 5:
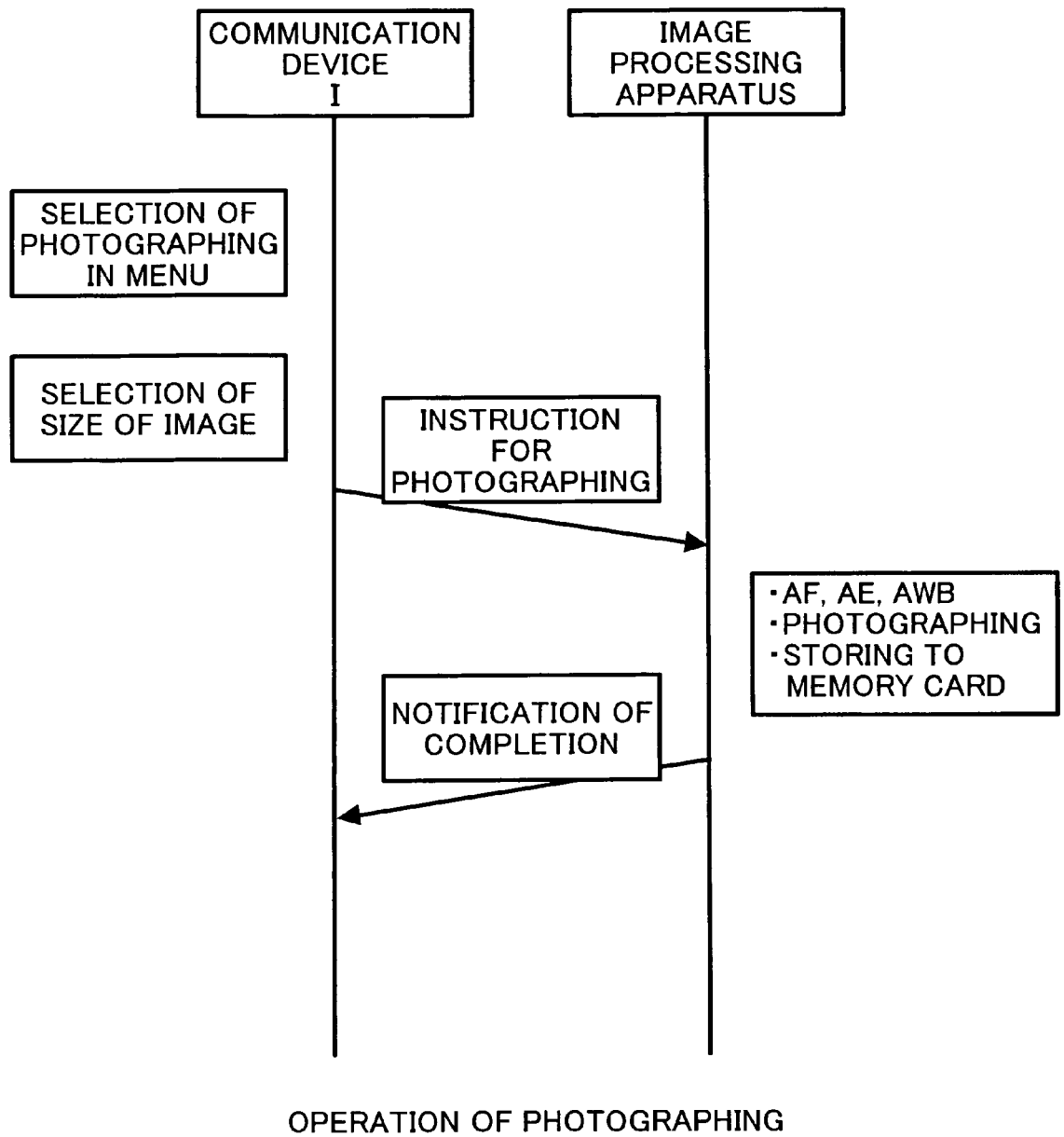
FIG. 5 is a diagram representing a flow of transmitting and receiving signals when carrying out an operation of photographing according to a second embodiment of the present invention by connecting the digital camera in FIG. 1 with the mobile phone in FIG. 2.

FIG. 5 is a pattern diagram of a flow of processing to explain an operation of photographing.

First of all, the user selects a photographing function and a size of a photographing image as a parameter of the photographing function by the displaying of the menu (see FIG. 4) on the liquid crystal display portion 29 of the communication device. Information which is selected is transmitted to the image processing apparatus together with an instruction for the photographing. The image processing apparatus, in this case, is the digital camera, and carries out respective adjustments of AF (Automatic Focus adjustment), AE (Automatic Exposure adjustment) and AWB (Automatic White Balance adjustment). Later, the photographing is performed, and image data is stored to the memory card 11, and a notification of completion is transmitted to the communication device. In this way, the photographing can be performed by control of the digital camera from a portable device, that is, the mobile phone.

Figure 6:
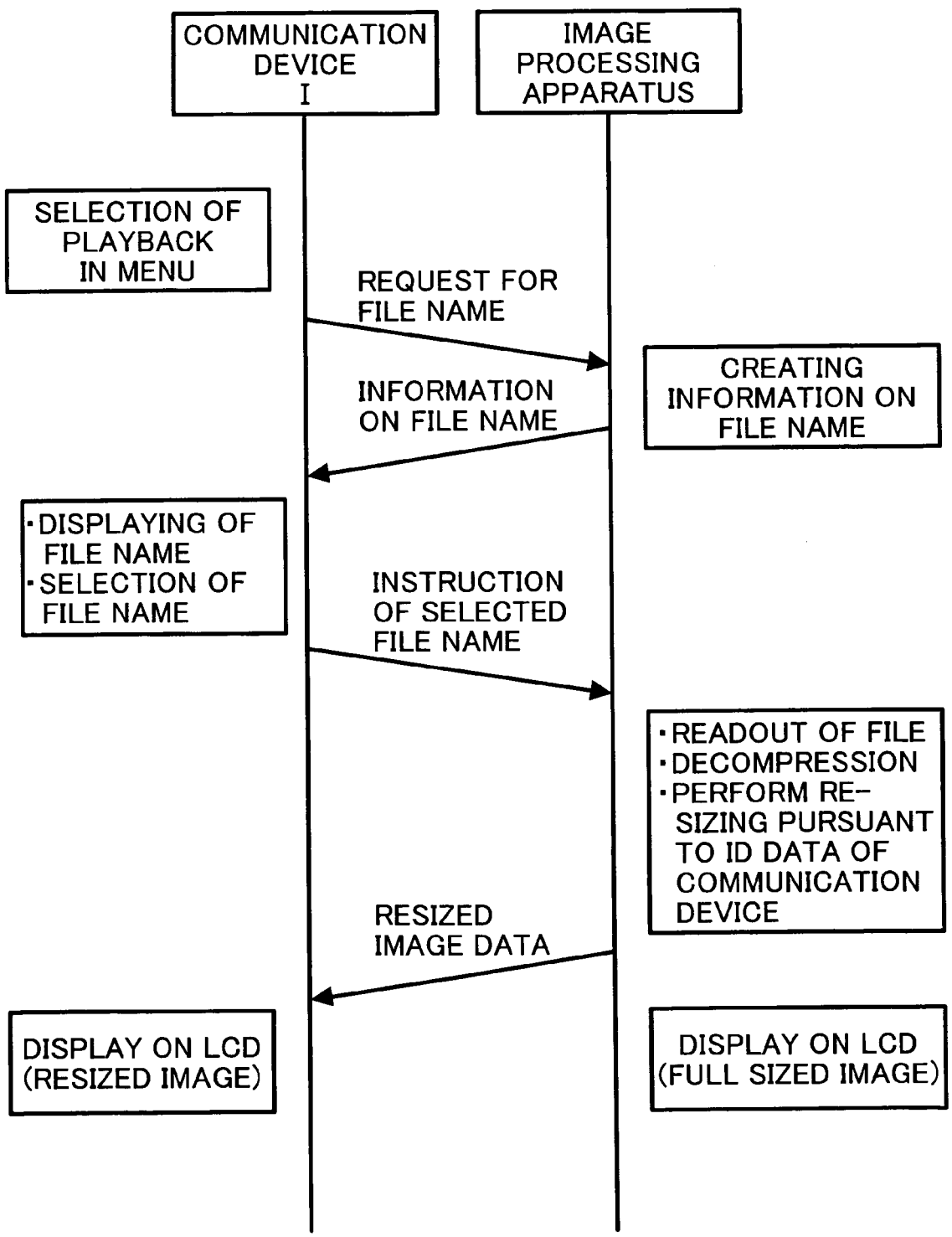
FIG. 6 is a diagram representing a flow of transmitting and receiving signals when performing an operation of a playback according to a second embodiment of the present invention by connecting the digital camera in FIG. 1 with the mobile phone in FIG. 2.

FIG. 6 is a pattern diagram of a flow of processing to explain an operation of performing a playback of the image data or the like photographed and stored in the memory card.

At first, if the user selects a playback function by the displaying of the menu (see FIG. 4) on the liquid crystal display portion 29 of the communication device, a signal for requesting a file name is sent to the image processing apparatus. Then, the image processing apparatus creates information on the file name of the memory card 11, and transmits the created information on the file name to the communication device. In the communication device, a list of the file name can be displayed on a display screen of the liquid crystal display portion 29, and the user selects a desired file from the list. The selected file name is transmitted to the image processing apparatus in response to an operation of selecting. The image processing apparatus reads out the corresponding file from the memory card 11, and the decompression is carried out if the data is compressed, and further, carries out resizing of the image data in accordance with a size of the image that can be displayed on the liquid crystal display portion 29 of the communication device pursuant to the ID data of the communication device. The resized image data is then transmitted to the communication device, and the communication device can display the resized image data on the liquid crystal display portion 29.

As described above, it becomes possible to control the digital camera from a distant place through the mobile phone, and the ordinary digital camera and the like can easily be diverted to be used as a simplified monitoring camera, thus it becomes possible to effectively utilize resources of the camera. By this means, "a control interface portion", to control the camera, is established.

Meanwhile, although the transmission and the receiving data should be limited to minimum only necessary to be used on the communication, it becomes possible to automatically set the transmission and the receiving data only by the ID data of the communication device as mentioned above.

In addition, a function for displaying monitoring can also be selected from the communication device. Accordingly, a case in which the function for the monitoring is to be selected will be described hereinafter. In this case, at first, an instruction for starting the displaying of the monitoring as a control data of a function of the camera is transmitted to the image processing apparatus. The image processing apparatus starts an imaging process by operating an imaging function and a function of digital processing. Then, an imaging data is also transmitted to the communication device through an interface of media. By this means, a "media interface portion" is established. By doing so, a corresponding function of the image processing apparatus corresponding to a function of the processing of the image and the like, which is not provided in the communication device, can be diverted to be used by the communication device.

Also in FIG. 3, when the communication device has a telephone function, data of calling of the telephone function is transmitted to a digital processing portion within the image processing apparatus as continuous data, and if the image processing apparatus has a voice playback function, a voice of the calling data can be played. By doing so, even if the communication device is an inexpensive communication device, a usage of functions for the displaying and the playback or the like of the inexpensive communication device can be widened by utilizing the corresponding functions of the image processing apparatus.

Furthermore, in FIG. 3, it is also possible to multiplex various data in the communication between the image processing apparatus and the communication device by time-sharing and the like. By doing so, it becomes possible to transmit the continuous data such as the calling data as mentioned above, data of the control interface which is for control the camera, and data of the media interface virtually simultaneously, thus the respective functions can be achieved. By providing the image processing apparatus and the communication device as such, it becomes possible to control the image processing apparatus without hindering continuous processing such as a telephone call carried out in the communication device. Also, the image data and the like can be transmitted without ceasing the telephone call, thus it becomes possible to, for example, confirm an image file of document while conversing.

Next, a third embodiment of the present invention which carries out at least one of the storing of data to a data storing portion such as the memory card 11 and readout of the data from the data storing portion, from the communication device using the control data, will be described with referring to FIGS. 7 and 8.

Figure 7:
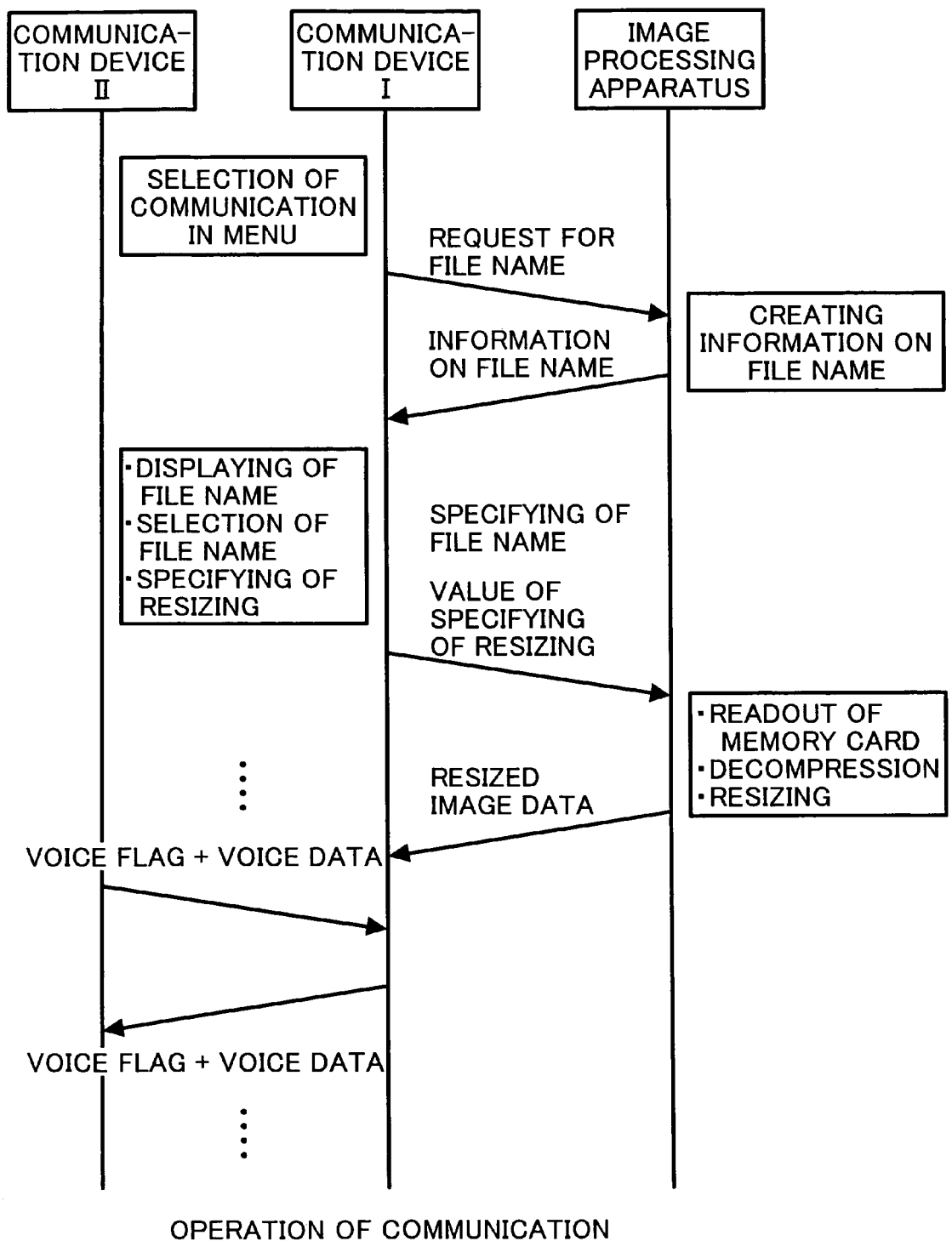
FIG. 7 is a diagram representing a former part of a flow of transmitting and receiving signals when carrying out an operation of a communication by connecting the digital camera in FIG. 1 which corresponds to a third embodiment of the present invention with the mobile phone in FIG. 2.
Figure 8:
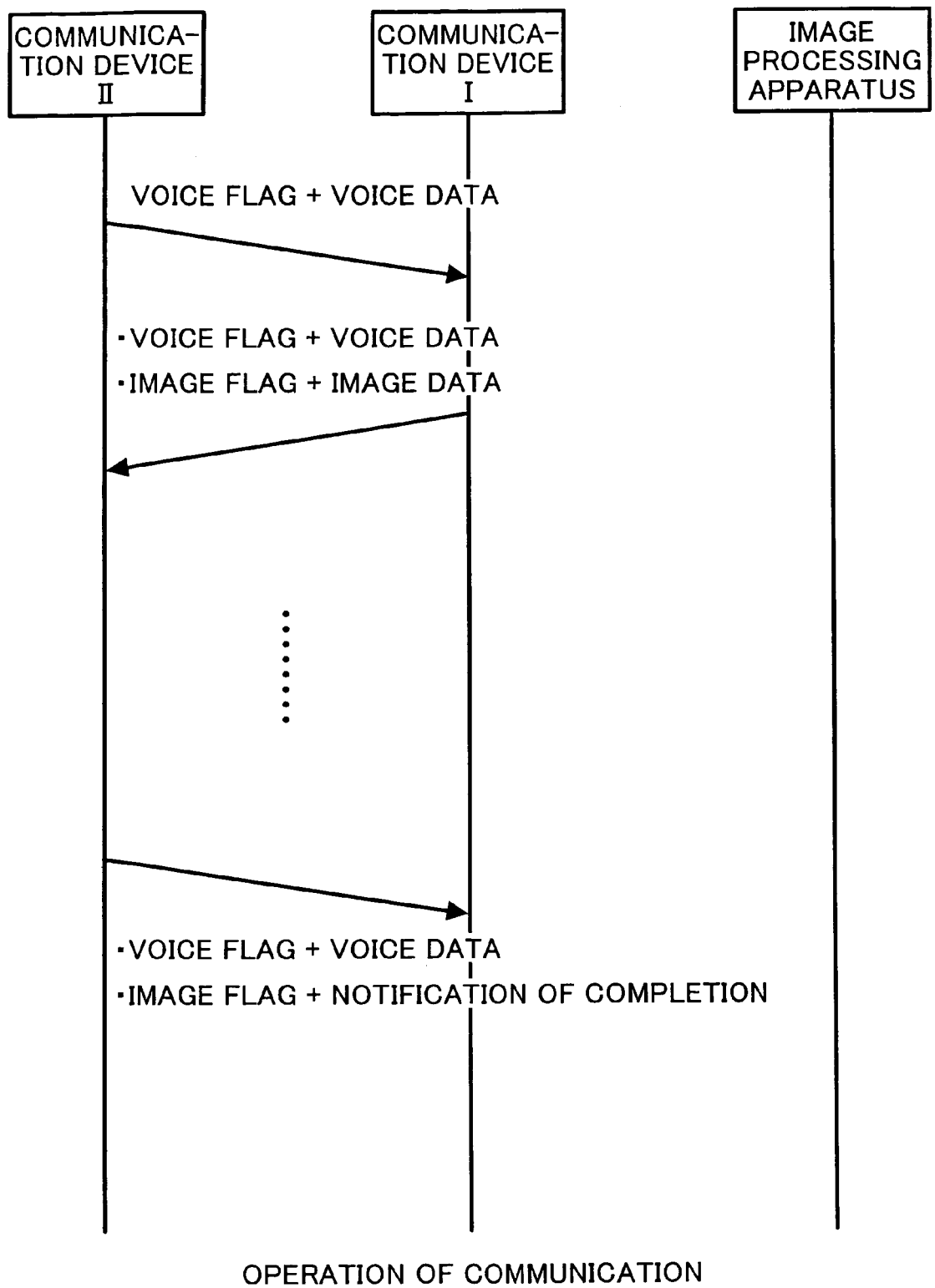
FIG. 8 is a diagram representing a latter part of the flow of transmitting and receiving the signals of the processing of the communication shown in FIG. 7.

FIG. 7 shows an operation of the communication. The first communication device I is in a calling state with the second communication device II, and transmits and receives voice data as the calling data by, for example, the telephone line. In this case, the voice data is transmitted and received together with a voice flag which shows that data is the voice data. If the user selects a transmission function by the menu on the display screen of the liquid crystal display portion 29 of the first communication device I while the calling is performed, the signal for requesting the file name is sent to the image processing apparatus. The image processing apparatus, then, creates the information on the file name of the memory card 11, and transmits the created information on the file name to the communication device.

In the communication device, the list of the file name can be displayed on the display screen of the liquid crystal display portion 29, and the user selects a desired file from the list.

In this case, the user can further select specifying of the resizing of a transmission file so as to specify the resizing of the transmission file. In the resizing, the selected image of the transmission file is transmitted to the second communication device II. If there is a usage of the image in the second communication device II which is a destination of the selected image to be transmitted, or a limitation is provided in the second communication device II which receives the selected image, the user can select setting of the resizing which conforms to the usage or the limitation.

The selected file name and a value of the specifying of the resizing are transmitted to the image processing apparatus. The image processing apparatus reads out the corresponding file from the memory card 11, and carries out the decompression if the data is compressed, and furthermore, resizes the image to the specified size. The first communication device I transmits the resized image to the second communication device II if the first communication device I receives the resized image. In this case, the image data is divided into a plurality of blocks as shown in FIG. 8, and each of the blocks is transmitted by being combined with the calling data together with an image flag which represents that data to be transmitted is the image data. In the second communication device II, the voice data and the image data are separated by the flag, and the second communication device II performs the notification of the completion to the first communication device I when the receiving of all the images is finished. In this way, the media interface portion is established further.

Also, in the case when the mobile phone is used as the communication device as in the example described above, it is possible to transmit the calling data received from the mobile phone to the image processing apparatus, and store the received calling data to the memory card 11 of the image processing apparatus as a file. When the image data is combined with the calling data, the voice data and the image data are separated, and are stored to the memory card 11 as separate files.

By doing so, data in which the photographing is performed or data which has been stored of the camera in the distant place can be effectively used. Meanwhile, although the transmission and the receiving data should be limited to the minimum only necessary to be used on the communication, it becomes possible to automatically set the transmission and the receiving data by the instruction of the communication device as mentioned above.

Next, there are many variations in the media interface portion, and some of the variations in the media interface portion will be described hereinafter.

In such a case in which the mobile phone is used as the communication device, it is possible to transmit data which has been processed with a voice-analog process and coded by the CODEC portion, to the image processing apparatus and stored that data to the memory card of the image processing apparatus as a file. In this case, means in the communication device such as the mobile phone and the like can be utilized without any waste, by providing the means in the communication device such as the mobile phone and the like to be also used as voice inputting means when storing the voice data to the nonvolatile memory such as the memory card 11 or the like of the image processing apparatus.

In addition, in a case or the like when the mobile phone is used as the communication device, it is possible to transmit the voice data stored in the memory card 11 of the image processing apparatus as a file to the communication device, and decode the transmitted voice data by the CODEC portion 34, apply an analog process onto the decoded voice data and output the processed voice data from the speaker of the mobile phone in a sound. As described, when performing a playback of a voice file stored in the nonvolatile memory of the image processing apparatus, it is possible to utilize voice outputting means in the communication device such as the mobile phone and the like without any waste, by providing the voice outputting means in the communication device such as the mobile phone and the like to be also used as voice outputting means.

Also, here, it is supposed here that the image file has been stored in the memory card 11 of the image processing apparatus. In this case, it is possible to transmit the voice data encoded by the mike of the mobile phone, the voice analog process and the CODEC portion 34, to the image processing apparatus, and store the encoded voice data to the memory card 11 of the image processing apparatus as the voice file that corresponds to that image file. For example, an association of the image file and the voice file can be carried out by a prescription in the file name. More specifically, a name of the image file is set as "JPEG0003. JPG", and a name of the voice file, which is to be associated with the image file, is set as "WAVE0003. WAV" to have numbers in 4 digits between the name of the image file and the name of the voice file to be in the same numbers (0003 in the example), and store the voice file to the memory card.

In such case, a reciprocal relationship between each files is maintained by applying same process onto all the files that the numbers in the 4 digits conform to each other when carrying out the transmitting or deleting and the like in the image processing apparatus.

By doing so, the voice inputting means can be utilized without any waste, by providing the voice inputting means to be also used by the communication device such as the mobile phone and the like when the voice file is to be associated and stored as a comment to the image file stored in the nonvolatile memory of the image processing apparatus.

Also, there is a limitation in number of characters in the file name of the image file stored in the memory card 11 of the image processing apparatus, and commonly, the file name is in alphanumeric character such as the "JPEG0003" which shows an order of storing. It cannot be said that the name in the alphanumeric character such as the "JPEG003" is easily-understandable information that represents the image. In the image file, a tag for comment, which is possible to write-in information of characters is also existed, and therefore it is desirable to write the information regarding the image into the comment tag.

It is supposed here that the user is able to select symbols such as characters by the operation of the operating portion 23 of the communication device. Particularly in a case that the communication device is the mobile phone, it is convenient to input the characters since there is a large number of operating buttons in the mobile phone, and the mobile phone is equipped with a function for inputting a code of character as a standard if the mobile phone is the one that has an e-mail function. This character code may be transmitted to the image processing apparatus and the transmitted character code may be added to the comment tag of the file stored in the memory card 11.

By doing so, means for inputting character symbol can be utilized without any waste, by providing the means for inputting character symbol to be also used by the operating portion 23 of the communication device such as the mobile phone and the like when the character code is to be added to the comment tag within a file header of the image file stored in the non-volatile memory of the image processing apparatus.

Although it has been mentioned above that the character code is added in the file of the image processing apparatus, it is also possible to utilize the processing of the image processed in the image processing apparatus from the communication device. For example, it may also be recommendable to send font data in a format such as bitmap from the communication device to the image processing apparatus, and write that font data into the image data and transmit the image data with the font data to the communication device. By doing so, the comment which relates to the image is overwritten on the image itself in the received image received from the image processing apparatus, thus the image can be recognized easily by only viewing the playback image without using a PC (Personal Computer) or the like.

Furthermore, in a case of transmitting and receiving files such as the image by the communication device I and the communication device II and the like, it is not easy to grasp what the file is if the file name is in the alphanumeric symbols which merely indicate the order of the photographing, and thus it is inconvenient. Accordingly, the communication device is provided to be able to select a mode to handle the file name from a mode of the file name in an alphanumeric order and a mode of the file name in virtual. In this case, in the virtual file name mode, it is also possible to provide the communication device to be able to display the file names in which the character codes have been added to the predetermined tags and which have been associated, and to select a corresponding file to be processed such as the process of the transmission within the displayed file names, at the time of displaying the list of the file name as described above. By attaching a temporary file name which is easy to be understood by means of the comment in characters to the file, separately from the file name which is in the order of storing, it becomes possible to allow the user to grasp a content of the file name from the file name easily.

What is claimed is:

1. An image processing apparatus, comprising:
    a camera function portion which includes a central processing unit to control the entire image processing apparatus, an operating portion to input an operation externally, an imaging portion to photograph an image of a subject, a digital processing portion to perform a digital processing to various signals including photographing data of said imaging portion, a displaying portion to display image data processed by said digital processing portion, a communication function portion housed in said image processing apparatus or provided attachably and detachably on said image processing apparatus and configured to communicate with an external communication device, and a data storing portion to store digital data which relates to said digital processing portion;
    a communication judging portion to judge whether or not a communication with an external communication device with respect to a signal from said external communication device is possible; and
    a data communication portion which carries out the communication with said external communication device when it is judged by said communication judging portion that the communication is possible, and transmits communication data including a program to control said camera function portion from said external communication device to said external communication device, wherein
    the communication data with the external communication device include an interface program to control said camera function portion, and said data communication portion includes a control interface portion to control said camera function portion using control data from said external communication device,
    the communication data with the external communication device include a media interface program to transmit data to and receive data from said digital processing portion in said camera function portion, and said data communication portion includes a media interface portion to carry out at least one of processing of digital processing data in said digital processing portion received at said external communication device and processing of transmitted data from said external communication device in the digital processing portion, using the control data from said external communication device,
    the data communication portion includes a communication portion for continuous data to mutually transmit and receive continuous data between the image processing apparatus and said external communication device,
    in the communication between the image processing apparatus and said external communication device, the communication of the continuous data by the communication portion for continuous data is capable of communicating concurrently with at least one of the data communication by the camera control interface portion and the data communication by the media interface portion,
    the media interface program of the communication data with the external communication device transmits and receives the data in said data storing portion in the camera function portion,
    the media interface portion of said data communication portion carries out at least one of readout of the data from said data storing portion and recording of the data to the data storing portion, using said control data from said external communication device, and
    said media interface portion is further configured to receive the voice data inputted by a microphone and processed with encoding in said external communication device and record to said data storing portion.

2. The image processing apparatus according to claim 1, wherein
    at least one of voice playback of voice data from said external communication device and playback display of the image data from said communication device is carried out, when it is at least judged by said communication judging portion that the communication is possible.

3. The image processing apparatus according to claim 1, wherein
    said media interface portion transmits the voice data stored in said data storing portion in the camera function portion to the external communication device.

4. The image processing apparatus according to claim 1, wherein
    said media interface portion is further configured to resize the image data in said camera function portion of said image processing apparatus according to a resizing method based on control data transmitted from said external communication device and transmit the resized image data to the external communication device.

5. The image processing apparatus according to claim 1, wherein said media interface portion is further configured to receive symbol information created by using a function for creating the symbol information which includes characters provided in said external communication device and add the symbol information to a selected recording file of said data storing portion in said camera function portion.

6. The image processing apparatus according to claim 5, wherein said media interface portion is further configured to receive the symbol information which includes the characters provided in said external communication device to the image processing apparatus as image information which is utilized even in said camera function portion in the image processing apparatus.

7. The image processing apparatus according to claim 5, wherein said media interface portion is further configured to transmit information capable of selecting a method of selecting and specifying of a data file alternatively from a plurality of methods of selection and specify including a method of selectively specifying the data file by displaying an original file name of said data file on a displaying portion in said external communication device and a method of selectively specifying the data file by displaying the symbol information added to said data file on the display portion, when specifying the data file stored to said data storing portion in said camera function portion from said external communication device.

8. An image processing apparatus, comprising:

a camera function portion which includes a central processing unit to control the entire image processing apparatus, an operating portion to input an operation externally, an imaging portion to photograph an image of a subject, a digital processing portion to perform a digital processing to various signals including photographing data of said imaging portion, a displaying portion to display image data processed by said digital processing portion, a communication function portion housed in said image processing apparatus or provided attachably and detachably on said image processing apparatus and configured to communicate with an external communication device, and a data storing portion to store digital data which relates to said digital processing portion;

a communication judging portion to judge whether or not a communication with an external communication device with respect to a signal from said external communication device is possible; and a data communication portion which carries out the communication with said external communication device when it is judged by said communication judging portion that the communication is possible, and transmits communication data including a program to control said camera function portion from said external communication device to said external communication device, wherein the communication data with the external communication device include an interface program to control said camera function portion, and said data communication portion includes a control interface portion to control said camera function portion using control data from said external communication device, the communication data with the external communication device include a media interface program to transmit data to and receive data from said digital processing portion in said camera function portion, and said data communication portion includes a media interface portion to carry out at least one of processing of digital processing data in said digital processing portion received at said external communication device and processing of transmitted data from said external communication device in the digital processing portion, using the control data from said external communication device, the data communication portion includes a communication portion for continuous data to mutually transmit and receive continuous data between the image processing apparatus and said external communication device, in the communication between the image processing apparatus and said external communication device, the communication of the continuous data by the communication portion for continuous data is capable of communicating concurrently with at least one of the data communication by the camera control interface portion and the data communication by the media interface portion, the media interface program of the communication data with the external communication device transmits and receives the data in said data storing portion in the camera function portion, the media interface portion of said data communication portion carries out at least one of readout of the data from said data storing portion and recording of the data to the data storing portion, using said control data from said external communication device, and said media interface portion is further configured to receive the voice data inputted by a microphone and processed with encoding in said external communication device and associate the voice data with image data stored in said data storing portion in said camera function portion to store them in said data storing portion.

* * * * *